United States Patent

(12) United States Patent
Okayasu

(10) Patent No.: US 10,406,559 B2
(45) Date of Patent: Sep. 10, 2019

(54) VIBRATION ACTUATOR

(71) Applicant: Nidec Copal Corporation, Tokyo (JP)

(72) Inventor: Shinsuke Okayasu, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 16/132,741

(22) Filed: Sep. 17, 2018

(65) Prior Publication Data

US 2019/0091725 A1    Mar. 28, 2019

(30) Foreign Application Priority Data

Sep. 28, 2017    (JP) .................................. 2017-188915

(51) Int. Cl.

| | | |
|---|---|---|
| *H04R 9/02* | (2006.01) | |
| *B06B 1/04* | (2006.01) | |
| *F16F 15/03* | (2006.01) | |
| *F16F 9/53* | (2006.01) | |
| *B05D 5/08* | (2006.01) | |
| *H04R 9/04* | (2006.01) | |

(52) U.S. Cl.
CPC ................ *B06B 1/045* (2013.01); *B05D 5/08* (2013.01); *F16F 9/53* (2013.01); *F16F 15/03* (2013.01); *H04R 9/025* (2013.01); *H04R 9/027* (2013.01); *H04R 9/043* (2013.01); *H04R 2209/024* (2013.01); *H04R 2400/03* (2013.01)

(58) Field of Classification Search
CPC ........ H04R 9/025; H04R 9/027; H04R 9/043; H04R 2400/03; H04R 2209/024; H04R 2209/027; B06B 1/045; H02K 33/16; H02K 33/18

USPC .... 381/396, 412, 413, 415, 420; 310/15, 25, 310/51
See application file for complete search history.

(56) References Cited

U.S. PATENT DOCUMENTS

| 2013/0033127 A1* | 2/2013 | Park ....................... H02K 33/18 310/25 |
|---|---|---|
| 2014/0001889 A1* | 1/2014 | Hong .................... H02K 33/18 310/25 |
| 2015/0016660 A1* | 1/2015 | Matsumura .............. H04R 9/06 381/415 |
| 2017/0110951 A1* | 4/2017 | Akanuma ............... H02K 33/16 |

FOREIGN PATENT DOCUMENTS

JP         2017-77153 A      4/2017

* cited by examiner

*Primary Examiner* — Huyen D Le

(74) *Attorney, Agent, or Firm* — Troutman Sanders LLP

(57) ABSTRACT

A vibration actuator having a stationary element; a movable element that is supported elastically so as to enable vibration on the stationary element; and a driving source for causing reciprocating vibration of the movable element in relation to the stationary element, wherein: the movable element comprises an opposed face that opposes an opposing face of the stationary element; a magnetic fluid that has viscosity is filled into a gap between the opposing face and the opposed face and is attracted magnetically to at least either the opposing face or the opposed face; and on the other of the opposing face or the opposed face, a holding region for retaining the magnetic fluid is provided, and a lipophobic surface, for repelling the magnetic fluid is provided so as to surround the holding region.

6 Claims, 5 Drawing Sheets

FIG. 1-a
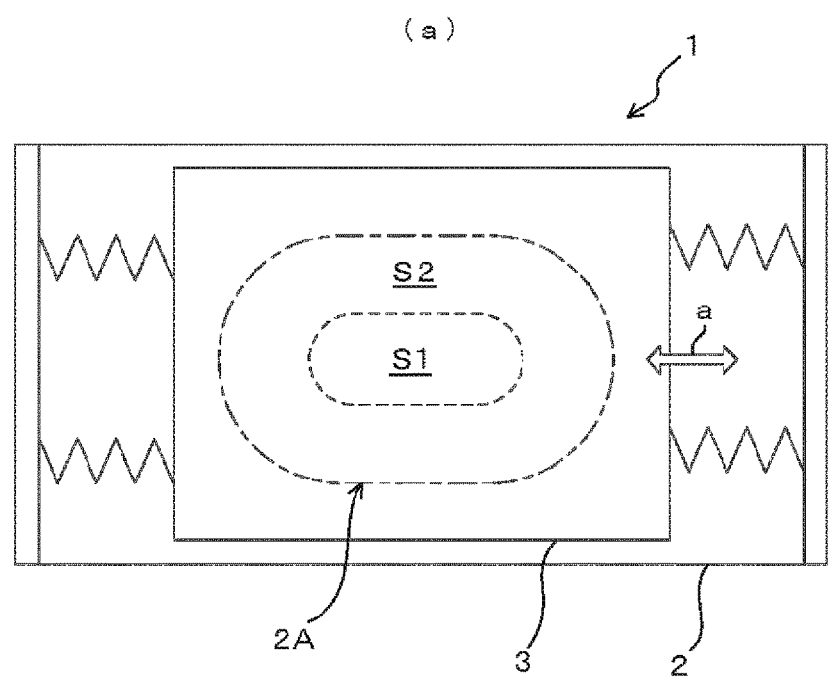
FIG. 1-b
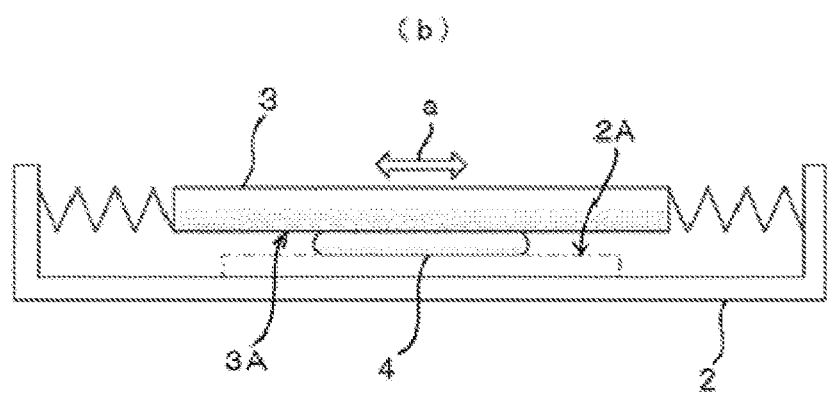

VIBRATION ACTUATOR

CROSS-REFERENCE TO RELATED APPLICATIONS

This application claims benefit of priority to Japanese Patent Application No. 2017-188915, filed Sep. 28, 2017. The entire contents of the application is hereby incorporated by reference.

FIELD OF TECHNOLOGY

The present invention relates to a vibration actuator.

BACKGROUND

Vibration actuators are built into mobile electronic devices, and are broadly used as devices to communicate to the user, through a vibration, that there is an incoming call, or that a signal, or the like, such as an alarm, has been generated, and have become indispensable devices in wearable devices, which are carried on the body of the user. Moreover, in recent years vibration actuators have been of interest as devices by which to achieve haptics (skin-sensed feedback) in the human interfaces such as touch panels.

In a vibration actuator, a movable element that is equipped with a weight and a spring is supported on a stationary element so as to enable vibration, where a coil or a magnet is attached to the movable element side, and the other is attached to the stationary element side, and a driving signal (a driving pulse) of the resonant frequency (the natural frequency) that is determined by the weight and the spring is applied to the coil to cause the movable element to vibrate at a large amplitude.

Moreover, in the prior art, as disclosed in Japanese Unexamined Patent Application Publication 2017-77153, a magnetic field having viscosity is filled into a gap that is open between the coil that is provided in the stationary element and the magnet that is provided in the movable element, to cause the magnetic fluid to function as a damper at the time of vibration of the movable element.

SUMMARY

The magnetic fluid in the conventional vibration actuator described above is held, by magnetic attractive force on the magnet of the movable element and the magnetic material of the stationary element, and thus has the characteristic of continuing to be maintained within the gap between the movable element and the stationary element, in relation to the vibration of the movable element. However, when the amplitude or vibration of the movable element is large, the kinetic energy that acts on the magnetic fluid through the vibration of the movable element will be large when compared to the force that continues to hold the magnetic fluid within the gap, and thus a problem is produced wherein the magnetic fluid is dispersed into the surroundings. When such a situation occurs, then, even after the vibration of the movable element is stopped, the magnetic fluid may not return into the original gap, and thus there is a problem in that the damping function of the magnetic fluid, and/or the function of reducing the sliding friction, through the interposition of the magnetic fluid, will not be achieved as per the design.

Moreover, when the volume of the magnetic fluid that is filled between the movable element and the stationary element in the vicinity thereof is gradually reduced through the dispersion of magnetic fluid that is described above, problems will occur such as not only an inability to achieve stabilized behavior of the movable element as the cumulative operating time becomes long, but also a tendency for the movable element to make direct contact with the stationary element, producing contact noises and preventing the vibration actuator from operating quietly.

The present invention is proposing order to handle problems such as these. That is, the object of the present invention is to prevent dispersion of the magnetic fluid that is filled between the movable element and the stationary element, to thereby sustain the operating performance of the vibration actuator.

In order to solve such a problem, the present invention is provided with the following structures:

A vibration actuator including a stationary element; a movable element that is supported elastically so as to enable vibration on the stationary element; and a driving source for causing reciprocating vibration of the movable element in relation to the stationary element, wherein: the movable element comprises an opposed face that opposes an opposing face of the stationary element; a magnetic fluid that has viscosity is filled into a gap between the opposing face and the opposed face and is attracted magnetically to at least either the opposing face or the opposed face; and on the other of the opposing face or the opposed face, a holding region for retaining the magnetic fluid is provided, and a lipophobic surface, for repelling the magnetic fluid is provided so as to surround the outside of the holding region.

BRIEF DESCRIPTION OF DRAWINGS

FIG. 1 is an explanatory diagram illustrating the schematic structure of a vibration actuator according to an embodiment according to the present invention (wherein FIG. a is a plan view and FIG. b is a side view).

DETAILED DESCRIPTION

Figure 2:
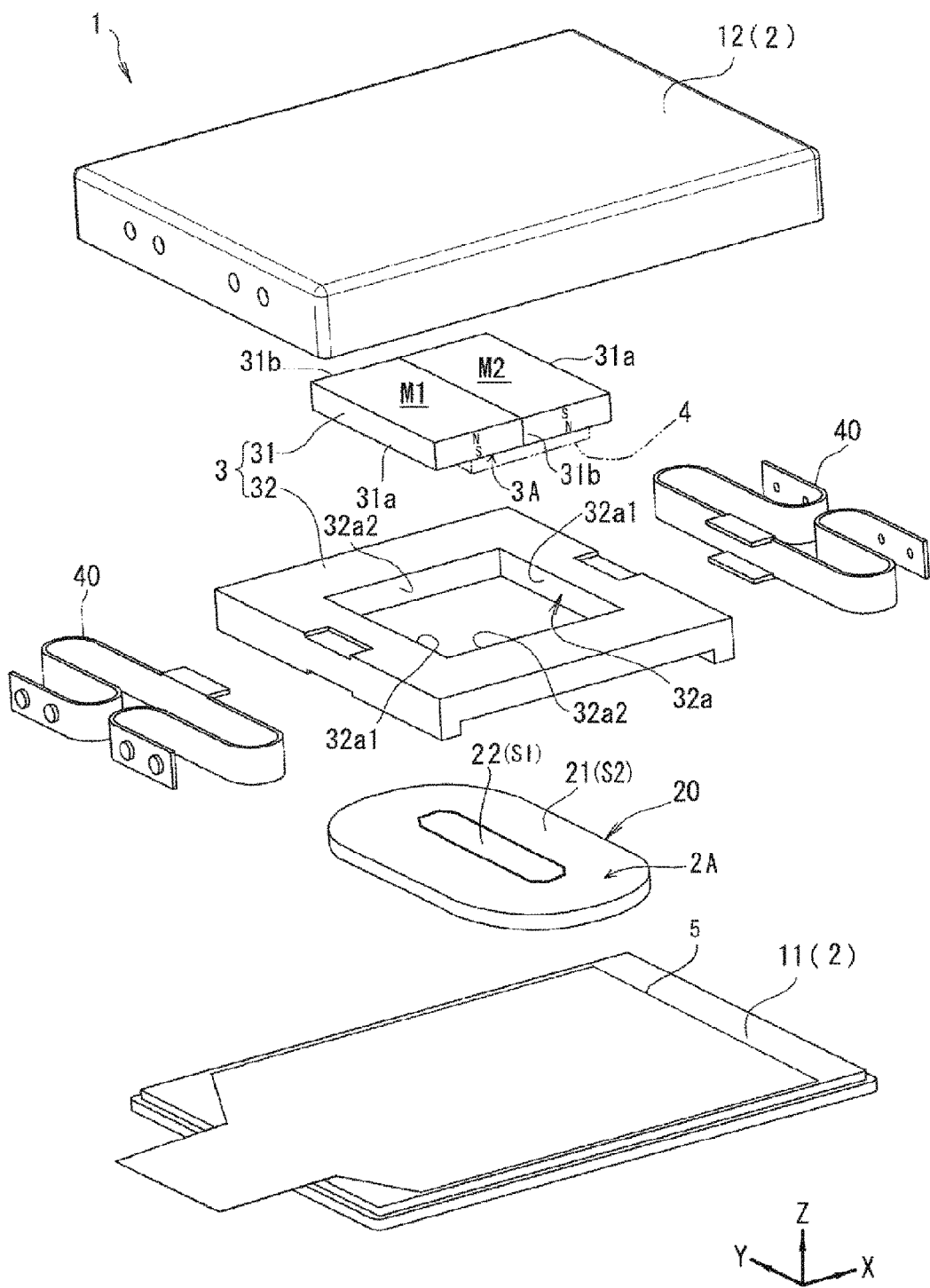
FIG. 2 is an assembly perspective diagram illustrating a specific example of a vibration actuator according to an embodiment according to the present invention.

Embodiments according to the present invention will be explained below in reference to the drawings. In the descriptions below, identical reference symbols in the different drawings below indicate positions with identical functions, and redundant explanations in the various drawings are omitted as appropriate.

As illustrated in FIG. 1, the vibration actuator 1 comprises: a stationary element 2; a movable element 3 that is supported elastically on the stationary element 2 so as to enable vibration; and a driving source, not shown, for causing the movable element 3 to vibrate reciprocatingly relative to the stationary element 2. The driving source is, for example, an electromagnetic driving source made from a coil and a magnet, where either the coil or the magnet is provided on the stationary element 2, and the other is provided on the movable element 3. The movable element 3 is supported on the stationary element 2 with an elastic member, such as a spring, or the like, therebetween, so as to vibrate reciprocatingly along the axial direction indicated by the arrow a in the figures.

The movable element 3 comprises an opposed face 3A that faces an opposing face 2A of the stationary element 2, and a magnetic fluid 4 that has viscosity and that is attracted magnetically to the opposed face 3A is filled into the gap between the opposing face 2A and the opposed face 3A. The opposing face 2A is a surface of any of a variety of types of materials, provided on the stationary element 2, and the opposed face 3A is a surface any of a variety of types of materials, provided on the movable element 3.

Given this, a holding region S1, for holding the magnetic fluid 4, along with a lipophobic surface S2, which repels the magnetic fluid 4, surrounding the outside of the holding region S1, are provided on the opposing face 2A of the stationary element 2. Here the holding region S1 a closed planar region, a surface wherein the lipophobic surface S2 is not provided. The lipophobic surface S2 is an annular surface region that surrounds the outside of the holding region S1. Note that while, in the explanation above, an example was presented wherein the holding region S1 and the lipophobic surface S2 were provided on the opposing face 2A of the stationary element 2, the holding region S1 and the lipophobic surface S2 may be provided on either the stationary element 2 or the movable element 3.

In such a vibration actuator 1, when the movable element 3 vibrates and applies a large kinetic energy to the magnetic fluid 4 that is contacted by the movable element 3, the lipophobic surface S2 is provided on the outside of the holding region S1 that stores the magnetic fluid 4, on the opposing face 2A that is the surface contacted by the magnetic fluid 4 on the stationary element 2 side, and thus the magnetic fluid 4 that would be expelled to the outside of the holding region S1 is repelled by the lipophobic surface S2, so as to be retained within the holding region S1. This enables an effective reduction in the risk that the magnetic fluid 4 will be dispersed during vibration of the movable element 3.

Such a vibration actuator 1 can suppress dispersion, into the surroundings, of the magnetic fluid that is filled into the gap between the stationary element 2 and the movable element 3, thus enabling the damping function of the magnetic fluid 4 that has viscosity, and the function wherein sliding friction is reduced through the interposition of the magnetic fluid 4, to be exhibited as designed. Moreover, even in regards to the cumulative use over an extended period of time, the magnetic fluid 4 that is filled into the gap between the stationary element 2 and the movable element 3 can be maintained at a proper volume, not only enabling maintenance of the stable behavior of the movable element 3, but also preventing direct contact between the movable element 3 and the stationary element 2, thereby suppressing the production of contact noise, and enabling maintenance of quiet operation of the vibration actuator.

Figure 3:
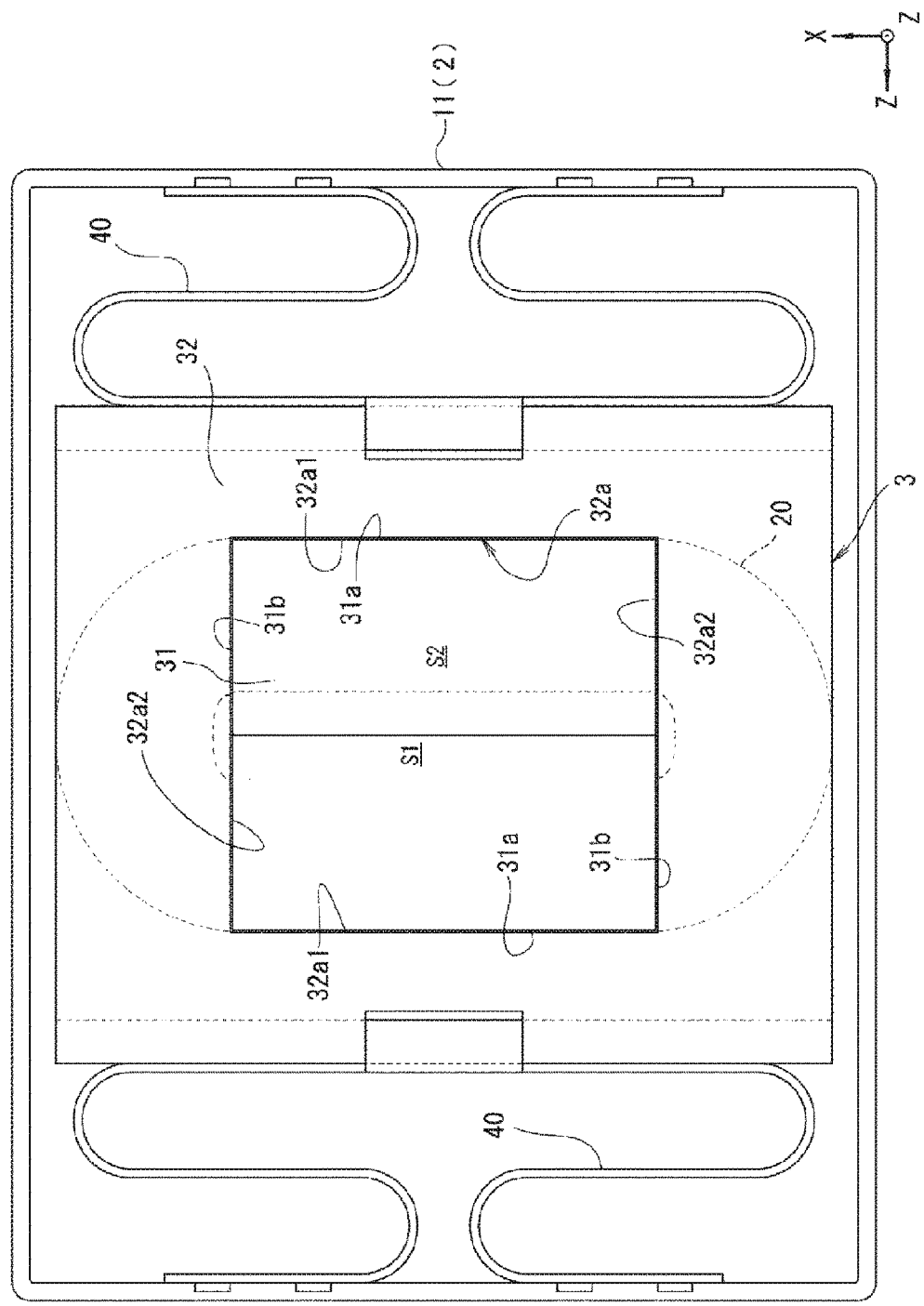
FIG. 3 is a plan view illustrating a specific example of a vibration actuator according to an embodiment according to the present invention.
Figure 4:
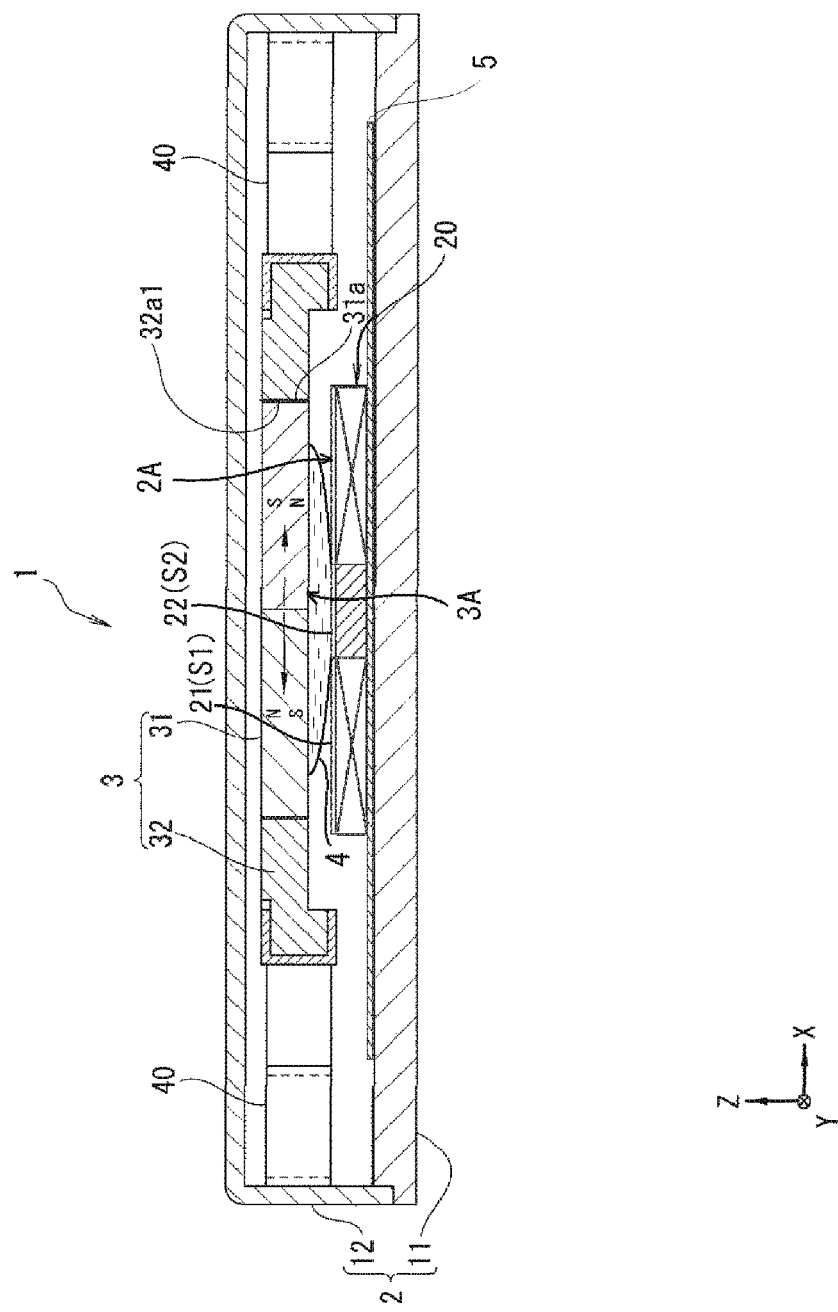
FIG. 4 is a cross-sectional diagram illustrating a specific example of a vibration actuator according to an embodiment according to the present invention.

A specific example of a vibration actuator 1 according to an embodiment according to the present invention will be explained below in accordance with FIG. 2 through FIG. 4, but the vibration actuator 1 according to the present invention is not limited to this specific example. In FIG. 2 through FIG. 4, the X direction of the arrow shown in the figures indicates the direction of vibration of the movable element (the axial direction), and the Y and Z directions of the arrows shown in the figures each indicate directions that are mutually perpendicular to the axial direction indicated by the X direction.

The vibration actuator 1 comprises: a coil 20 that has an opposing face 2A; a movable element 3 that vibrates along the opposing face 2A; and elastic members 40 that support elastically the movable element 3, so as to enable a reciprocating vibration; within a case that serves as a stationary element 2. A magnet 31 is provided on the movable element 3, where the magnet 31 has an opposed face 3A that faces the aforementioned opposing face 2A. Moreover, a magnetic fluid 4 is filled into the gap between the opposing face 2A and the opposed face 3A. The coil 20, and the magnet 31 that is opposing thereto, form a driving source for causing the movable element 3 to vibrate in the X direction, shown in the figure.

The case that serves as the stationary element 2 is formed in a flat hollow box shape from stainless steel, and, according to the example that is illustrated, is structured so that a flat box shape cover portion 12 that is open in the downward direction covers the top face of a base plate 11 of a rectangular flat plate shape.

The coil 20 is a flat plate-shaped coil that is wound along the surface of the base plate 11, along the direction of vibration, and is secured onto a flexible circuit board 5 that is secured onto the base plate 11. Supply of power to the coil 20 is through the flexible circuit board 5.

The surface of the side of the base plate that is opposite of the coil 20 is the opposing face 2A, described above, and the holding region S1, for holding the magnetic fluid 4, is formed above a wound core portion of the coil 20. The holding region S1 is a closed planar region, but is not necessarily limited to being over the wound core portion. The holding region S1 is in the vicinity of the center of the coil 20, and preferably is a region that includes the wound core portion, where the outer edge thereof may either be to the inside or the outside of the wound core portion of the coil 20.

In the movable element 3, a magnet 31 and a weight body 32 are provided integrally so as to be lined up in a direction along the opposing face 2A in the coil 20 (the X direction and the Y direction in the example that is illustrated). The magnet 31 has magnetic poles N and S, facing mutually opposing directions, on the two sides in the direction of vibration, in the opposed face 3A, along the opposing face 2A. Additionally, this magnet 31 has end faces 31a and 31b, which are essentially perpendicular to the opposing face 2A, at, respectively, both ends in the direction of vibration (the X direction) and both ends in the direction perpendicular to the direction of vibration (the Y direction).

The magnet 31 in the example that is illustrated is one that, if necessary, may be structured as a Halbach array, or the like, wherein one magnet portion M1, which has magnetic poles N and S on both sides thereof in the thickness direction (the Z direction), and another magnet portion M2, which has reversed magnetic poles S and N on both sides thereof in the thickness direction (the Z direction) are joined together in the direction of vibration.

The weight body 32 that forms the movable element 3 is formed from a metal material that has a relatively high specific gravity, such as tungsten. The weight body 32 has a fitting portion 32a for fitting the peripheral side faces of the magnet 31. The fitting portion 32a is a rectangular hole that passes through the weight body 32 in the thickness direction (the Z direction), and fits the magnet 31. In the weight body 32, the interior faces of the rectangular hole serve as securing surfaces 32a1 in 32a2 for securing the end faces 31a and 31b of the magnet 31. The means for securing the magnet 31, which is fitted into the fitting portion 32a, may be, for example, bonding or welding, fitting, screwing, or the like.

Two elastic members 40 are provided, so as to be positioned on both sides, in the direction of vibration, of the movable element 3. The elastic member 40 is, for example, a leaf spring that is made of metal, where one end side in the biasing direction is connected to the movable element 3 and the other end side is connected to a side wall of the cover portion 12 of the stationary element 2. As other examples of the elastic member 40, they may be, for example, leaf springs of shapes other than those in the example illustrations, coil springs, or the like.

The magnetic fluid 4 is a well-known viscous fluid that has the properties of sticking to magnetic or ferromagnetic material, and may be, for example, structured including ferromagnetic microparticles such as of magnetite, manganese zinc ferrite, or the like, with a surface activating agent and a base fluid (water or oil) covering the surfaces of the ferromagnetic microparticles. The magnetic fluid 4 is filled into the gap between the opposed face 3A of the magnet 31 and the opposing face 2A of the coil 20, and is retained on the opposed face 3A of the magnet 31 through this magnetic attraction, to function to improve the vibration characteristics of the movable element 3, or to function as a damper.

As described above, the opposing face 2A of the coil 20 has a holding region S1 for the magnetic fluid 4 and a lipophobic surface S2 that is provided on the outside thereof. Preferably a lipophilic surface is provided in the holding region S1, where an organic solvent coating is performed for this lipophilic surface. The coating surface, as the lipophilic surface, may be structured from an organic material such as wax, or, conversely from an inorganic material, or a mixed material of organic and inorganic, or the like. Moreover, the lipophobic surface S2 that is formed on the outside of the holding region S1 is structured from a fluorine resin coated surface such as of polytetrafluoroethylene, or the like, or from an inorganic silicone, or the like.

In such a vibration actuator 1, the magnetic fluid 4 that is filled into the gap between the opposing face 2A and the opposed face 3A is repelled by the lipophobic surface S2 on the outside of the holding region S1, to return to the holding region S1, and thus is able to suppress effectively the dispersion of the magnetic fluid 4 to the surroundings, in relation to vibration of the movable element 3. This not only enables the stable behavior of the movable element 3 to be maintained, but also prevents direct contact between the movable element 3 and the stationary element 2, suppressing the production of the contact noise, and enabling quiet operation to be sustained.

Figure 5:
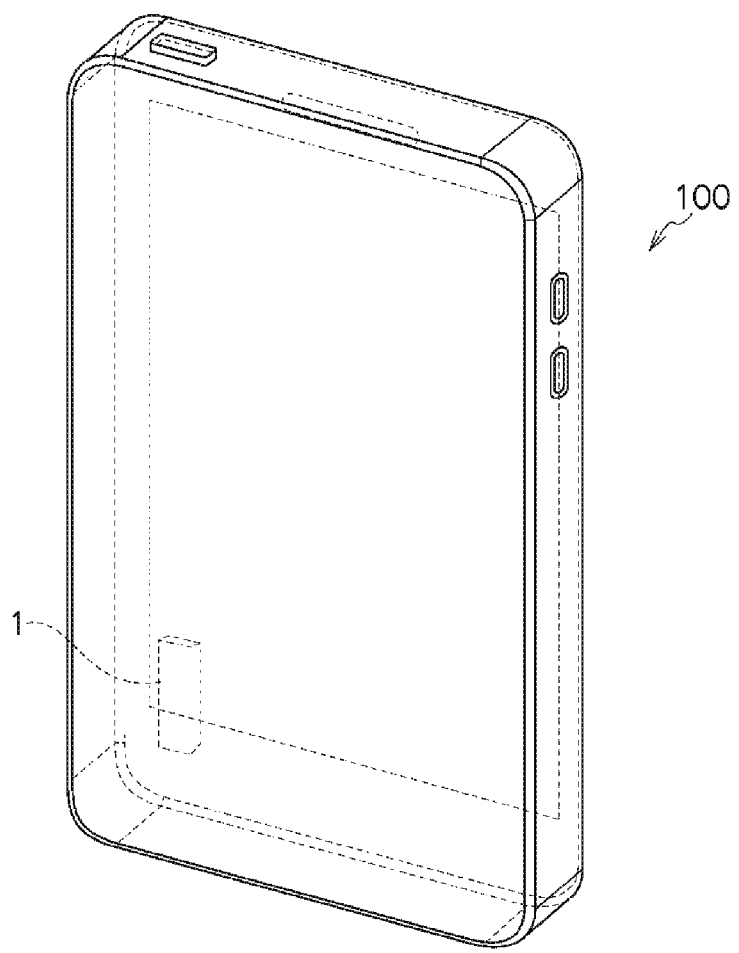
FIG. 5 is an explanatory diagram illustrating a mobile electronic device (a mobile information terminal) in which is provided a vibration actuator according to an embodiment according to the present invention.

A mobile electronic device 100 is depicted in FIG. 5 as an example of an electronic device that is equipped with a vibration actuator 1 according to an embodiment according to the present invention. The mobile electronic device 100 is equipped with a vibration actuator 1 within a case of a thin flat box shape, to structure a mobile information terminal (for example, a smart phone, a tablet personal computer, or the like). This structure enables a stabilized vibration by the vibration actuator 1, and a reduction in thickness and a reduction in size in the width direction, enabling the beginning or end of an operation, such as an incoming message in a communication function, an alarm function, or the like to be communicated to the user, with good responsiveness, through a stabilized vibration that tends not to produce noise.

Moreover, this enables prevention of dispersion of the magnetic fluid 4, caused by an extended period of use, by dropping impacts, or the like, and prevents a reduction in the volume of the magnetic fluid 4 that is retained between the opposed face 3A of the magnet 31 and the opposing face 2A of the coil 20, thus making it possible to provide a mobile electronic device 100 that is of high impact resistance and durability, that has a long service life, and that is resistant to faults.

Note that while in the embodiment set forth above the opposing face 2A was provided over the coil 20, as an alternate example the inner surface of the cover portion 12 may be the opposing face 2A, and the magnetic fluid 4 may be provided between this opposing face 2A and the magnet 31.

While embodiments according to the present invention were described in detail above, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:

1. A vibration actuator comprising:
   a stationary element;
   a movable element that is supported elastically so as to enable vibration on the stationary element; and
   a driver causing reciprocating vibration of the movable element in relation to the stationary element, wherein:
   the movable element comprises an opposed face that opposes an opposing face of the stationary element;
   a magnetic fluid that has viscosity is filled into a gap between the opposing face and the opposed face and is attracted magnetically to at least either the opposing face or the opposed face; and
   on the other of the opposing face or the opposed face, a holding region for retaining the magnetic fluid is provided, and a lipophobic surface, for repelling the magnetic fluid is provided so as to surround the outside of the holding region.

2. The vibration actuator as set forth in claim 1, wherein:
   the driver comprises a flat plate-shaped coil provided in the stationary element and a magnet provided in the movable element, facing the coil; and
   the opposing face is provided on the surface of the coil, and a region that is over a wound core portion of the coil, or that includes over the wound core portion, is used as the holding region.

3. The vibration actuator as set forth in claim 1, wherein:
   a lipophilic surface is provided at the holding region of the opposing face.

4. The vibration actuator as set forth in claim 3, wherein:
   the lipophilic surface is an organic solvent coated surface.

5. The vibration actuator as set forth in claim 1, wherein:
   the lipophobic surface is a fluorine resin coated surface.

6. An electronic device comprising a vibration actuator as set forth in claim 1.

* * * * *